(12) United States Patent
Yamamoto

(10) Patent No.: US 11,125,762 B2
(45) Date of Patent: Sep. 21, 2021

(54) AUTOMATIC ANALYZER

(71) Applicant: HITACHI HIGH-TECHNOLOGIES CORPORATION, Tokyo (JP)

(72) Inventor: Tsuyoshi Yamamoto, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 193 days.

(21) Appl. No.: 16/083,947

(22) PCT Filed: Jan. 25, 2017

(86) PCT No.: PCT/JP2017/002456
§ 371 (c)(1),
(2) Date: Sep. 11, 2018

(87) PCT Pub. No.: WO2017/163586
PCT Pub. Date: Sep. 28, 2017

(65) Prior Publication Data
US 2020/0191810 A1 Jun. 18, 2020

(30) Foreign Application Priority Data
Mar. 25, 2016 (JP) .............................. JP2016-061642

(51) Int. Cl.
*G01N 35/00* (2006.01)
*G01N 35/10* (2006.01)

(52) U.S. Cl.
CPC ....... *G01N 35/00584* (2013.01); *G01N 35/10* (2013.01); *G01N 2035/00306* (2013.01)

(58) Field of Classification Search
None
See application file for complete search history.

(56) References Cited

U.S. PATENT DOCUMENTS

2012/0109529 A1* 5/2012 Ariyoshi .......... G01N 35/00722
702/19
2013/0344622 A1* 12/2013 Wakamiya ......... G01N 35/1011
436/501

(Continued)

FOREIGN PATENT DOCUMENTS

CN 103718047 A 4/2014
JP 46-001026 B1 1/1971

(Continued)

OTHER PUBLICATIONS

Extended European Search Report received in corresponding European Application No. 17769633.3 dated Oct. 17, 2019.

(Continued)

*Primary Examiner* — Matthew D Krcha
(74) *Attorney, Agent, or Firm* — Mattingly & Malur, PC

(57) ABSTRACT

Position adjustment of an analysis module in an automatic analyzer is performed where a position adjustment instruction and a position where the position adjustment is actually performed are separated from each other. Position adjustment of probe mechanisms is performed by operating probe position adjustment switches formed on a housing of an analysis module. Where interlocking covers (103 and 113) for the module are present, the probe mechanisms of the module are stopped when the closed covers are opened. The position adjustment switches (101A and 101B) and the position adjustment switch (104) are disposed to be separated from each other by a distance at which the switches cannot be operated by a single hand of an operator at the same time. Even when the cover (103) is opened by continuously pressing the position adjustment switch (104), the probe mechanisms of the module are in an operable state for the position adjustment.

11 Claims, 5 Drawing Sheets

(56) References Cited

U.S. PATENT DOCUMENTS

2014/0202828 A1* 7/2014 Ishigami ............ G01N 35/1009
  198/340
2014/0241945 A1* 8/2014 Oonuma .............. G01N 35/025
  422/64

FOREIGN PATENT DOCUMENTS

| JP | 50-076668 A | | 6/1975 |
|---|---|---|---|
| JP | 54-002580 A | | 1/1979 |
| JP | 05-212597 A | | 8/1993 |
| JP | 05212597 A | * | 8/1993 |
| JP | 2012-181039 A | | 9/2012 |
| JP | 2013-250118 A | | 12/2013 |
| WO | 2013/035471 A1 | | 3/2013 |

OTHER PUBLICATIONS

International Search Report of PCT/JP2017/002456 dated Apr. 11, 2017.
International Preliminary Report on Patentability received in corresponding International Application No. PCT/JP2017/002456 dated Oct. 4, 2018.
Chinese Office Action received in corresponding Chinese Application No. 201780018973.X dated Apr. 1, 2021.

* cited by examiner

[FIG. 1]
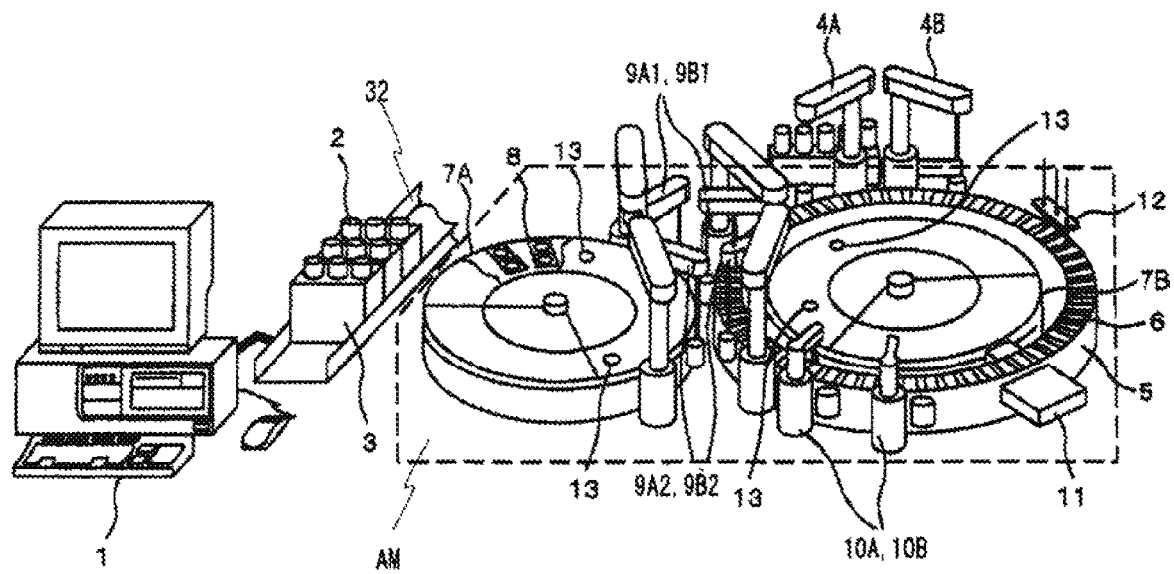
[FIG. 2]
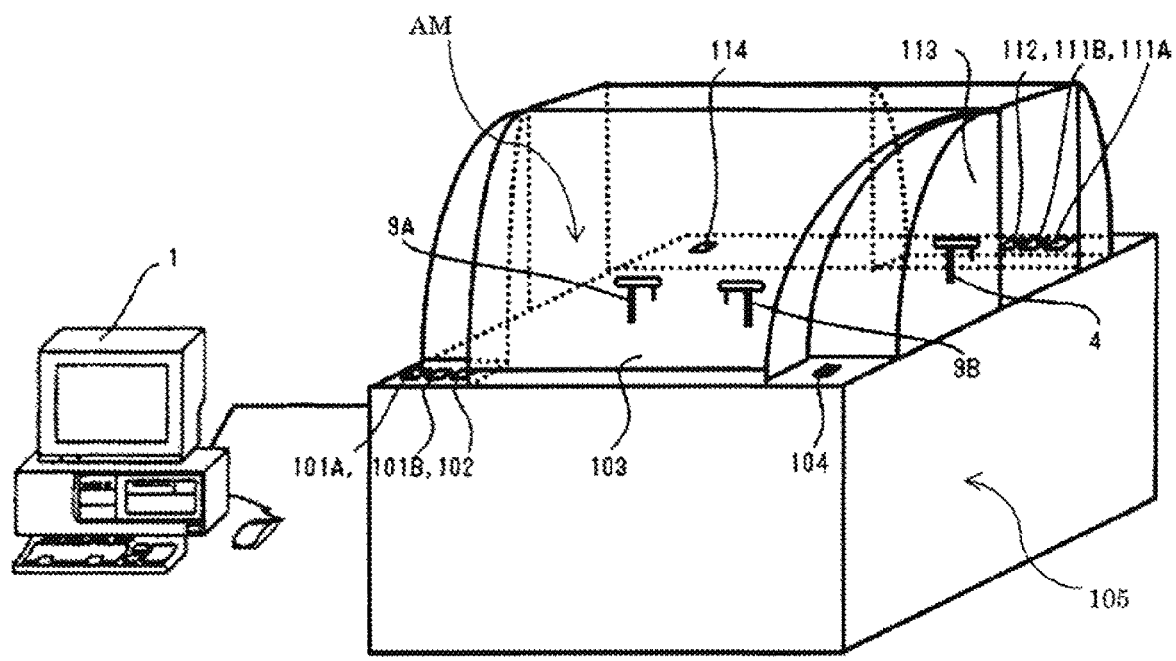
[FIG. 3]
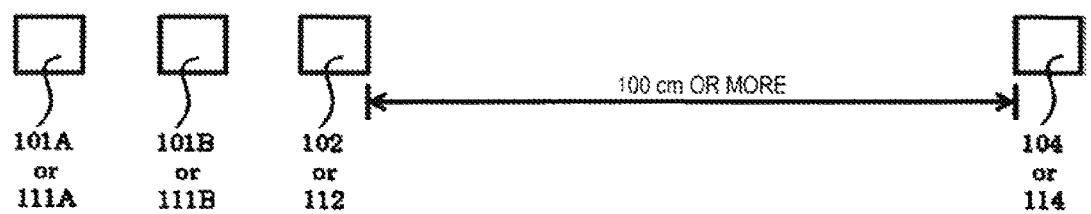

[FIG. 4]
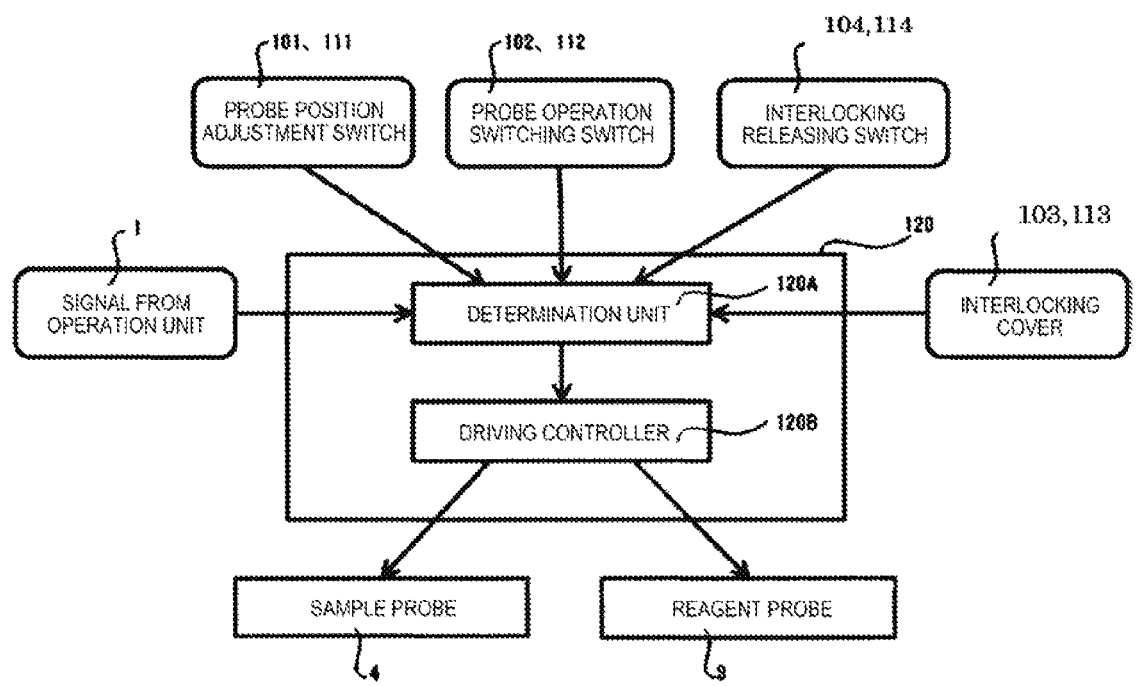

[FIG. 5]
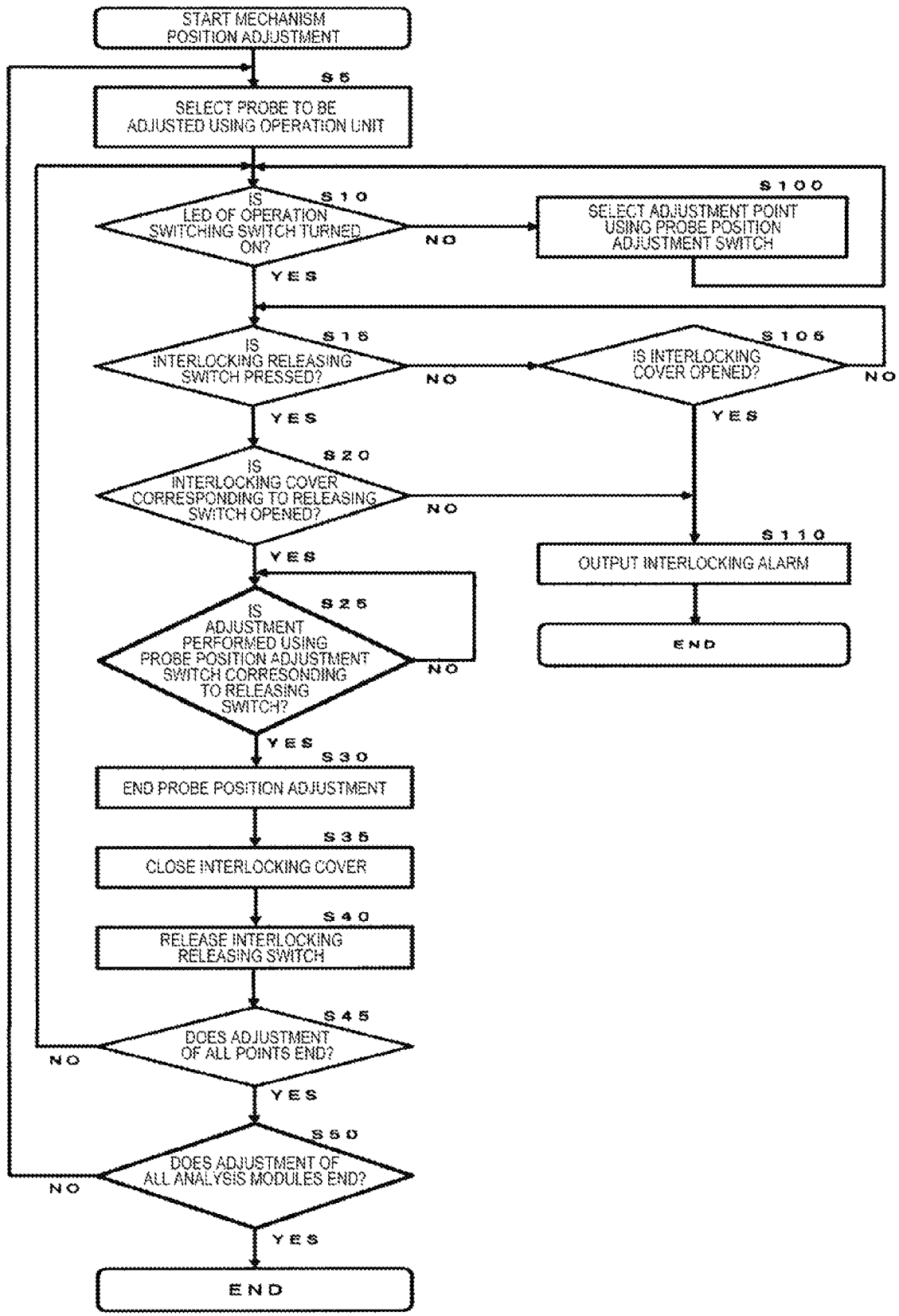

[FIG. 6]
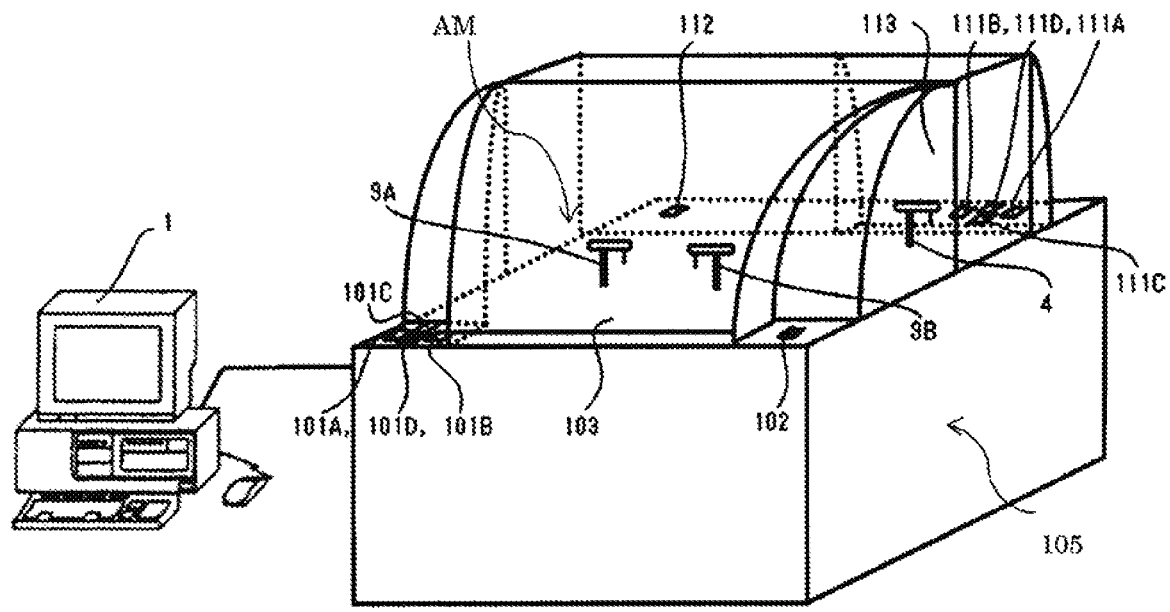
[FIG. 7]
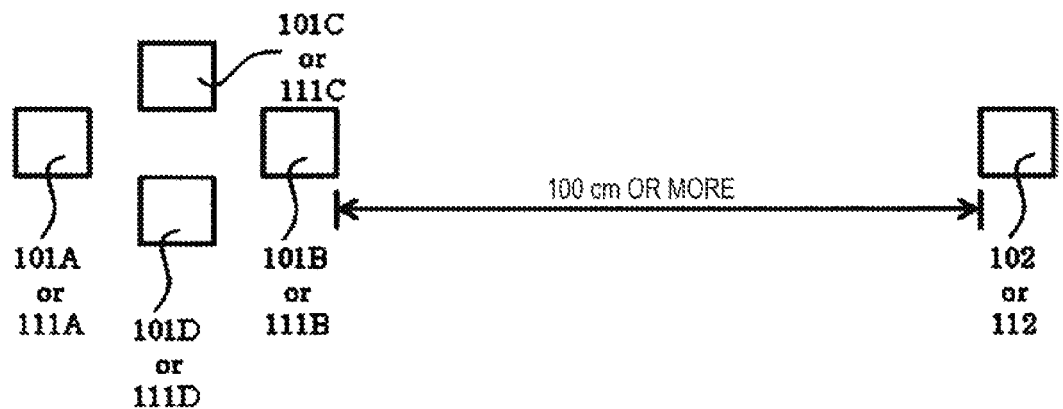

[FIG. 8]
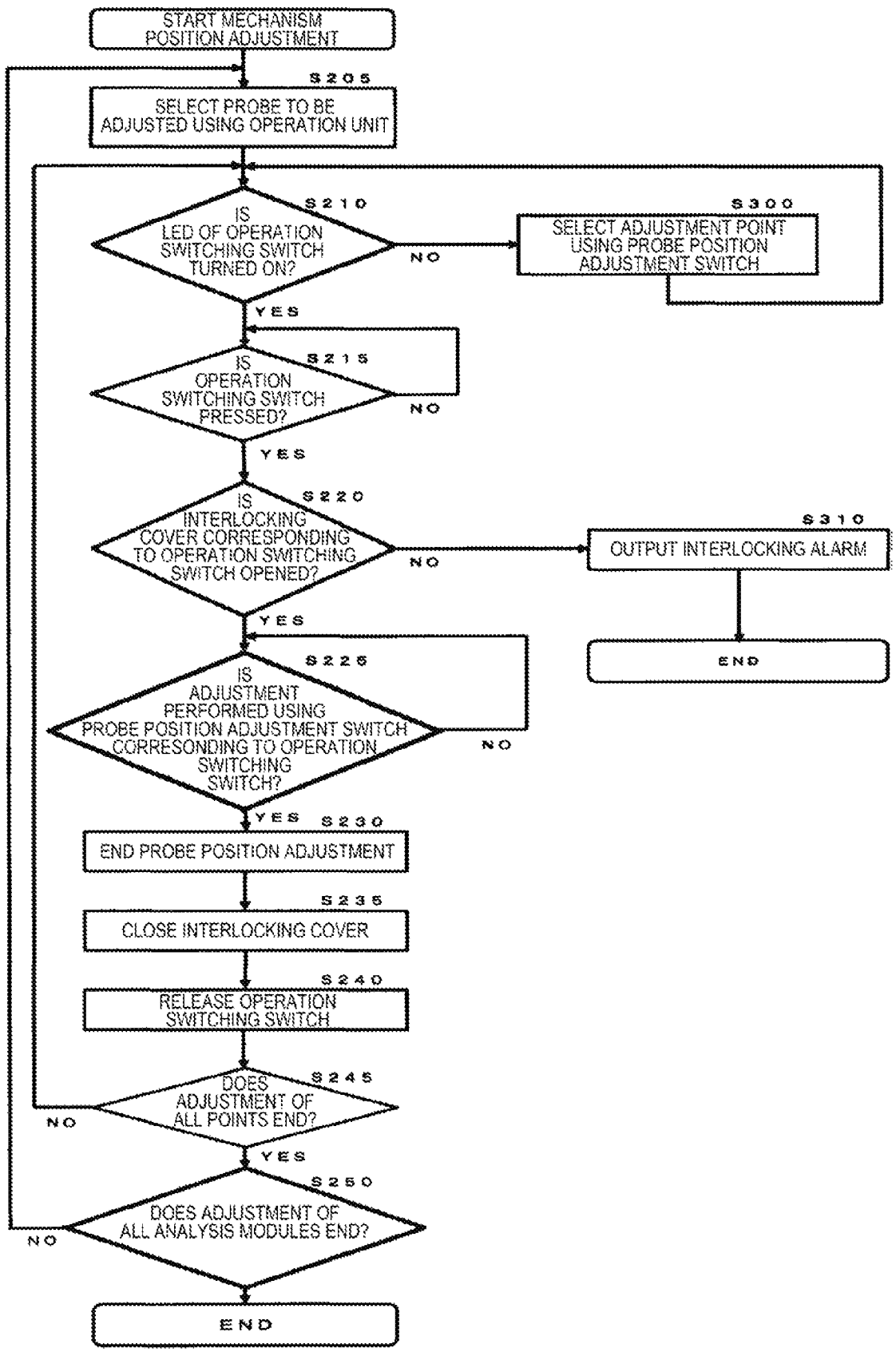

AUTOMATIC ANALYZER

TECHNICAL FIELD

The present invention relates to an automatic analyzer that performs qualitative and quantitative analysis of biological samples such as blood and urine.

BACKGROUND ART

It is known that an automatic analyzer includes: a sample dispensing mechanism and a reagent dispensing mechanism that aspirates a sample from a sample container and a reagent container at a predetermined position; a reaction container into which the sample aspirated from the sample dispensing mechanism and the reagent dispensing mechanism is discharged; and a controller that controls the sample dispensing mechanism and the reagent dispensing mechanism. The automatic analyzer has a configuration in which the measurement is performed after moving the mechanism units such as the sample dispensing mechanism to a predetermined position and performing aspiration and discharge of the sample and the like.

That is, the sample dispensing mechanism and the reagent dispensing mechanism aspirate the sample from the sample container and the reagent container, and then move to a position of the reaction container to discharge the aspirated sample into the reaction container.

Here, a sample analyzer described in PTL 1 has a configuration in which position adjustment of a sample dispensing mechanism and a reagent dispensing mechanism can be performed by operating an operation controller such that the sample dispensing mechanism and the reagent dispensing mechanism move to a center portion of a sample container, a reagent container, and a reaction container.

CITATION LIST

Patent Literature

PTL 1: JP-A-2012-181039

SUMMARY OF INVENTION

Technical Problem

However, as in the analyzer described in PTL 1, since fine adjustment is performed at an installation position of the device, when the operation controller that gives a position adjustment instruction and a position where the position adjustment is actually performed are separated from each other, an operator cannot check the position adjustment while giving the position adjustment instruction.

Therefore, two operators including an operator that performs a work of checking whether or not the mechanism units are at a predetermined position or performs an operation control after giving the position adjustment instruction and an operator that performs the position adjustment are necessary, and there is a problem in that the adjustment work is complicated.

In addition, in the automatic analyzer, an interlocking cover is provided in an analyzing unit, and it is necessary to release interlocking for checking during the position adjustment of the mechanism units. In a case where the position adjustment is performed in a state where the interlocking cover is opened and the interlocking is released, when an operator carelessly moves a hand or the like close to an analysis mechanism during the operation, contact between the analysis mechanism and the operator may occur, and thus it is necessary to pay attention in terms of safety.

An object of the present invention is to perform position adjustment of a dispensing mechanism of an analysis module alone without making the adjustment work complicated even in a case where an operation controller that gives a position adjustment instruction and a position where the position adjustment is actually performed are separated from each other. In addition, another object of the present invention is to realize an automatic analyzer provided with an interlocking cover and the safety regarding position adjustment of a dispensing mechanism which is performed in a state where interlocking is released can be improved.

Solution to Problem

In order to achieve the objects, the present invention is configured as follows.

An automatic analyzer includes: an analysis module including an a sample dispensing mechanism that aspirates a sample from a sample container and discharges the aspirated sample into a reaction container, a reagent dispensing mechanism that aspirates a reagent from a reagent container and discharges the aspirated reagent into the reaction container, and a photometer that measures the sample in the reaction container; first and second position adjustment switches that are disposed on a housing of the analysis module and are operated by an operator to adjust an operation position of either the sample dispensing mechanism or the reagent dispensing mechanism; and a position adjustment controller that drives the dispensing mechanism according to a position adjustment instruction from the first and second position adjustment switches.

The first position adjustment switch and the second position adjustment switch are disposed to be separated from each other by a distance at which the first position adjustment switch and the second position adjustment switch are not operable by a single hand of the operator at the same time.

Advantageous Effects of Invention

According to the present invention, position adjustment of the dispensing mechanism of the analysis module alone can be performed without making the adjustment work complicated even in a case where the operation controller that gives a position adjustment instruction and a position where the position adjustment is actually performed are separated from each other. In addition, the automatic analyzer can be realized in which the safety regarding position adjustment of the dispensing mechanism which is performed in a state where interlocking is released can be improved.

BRIEF DESCRIPTION OF DRAWINGS

FIG. 1 is a diagram illustrating an overall configuration of an automatic analyzer to which the present invention is applied.

FIG. 2 is a diagram illustrating a configuration of a system for performing position adjustment of a dispensing mechanism in an automatic analyzer according to a first embodiment of the present invention.

FIG. 3 is a diagram illustrating disposition of switches disposed on a housing of an analysis module according to the first embodiment of the present invention.

FIG. 4 is a diagram illustrating a configuration of main parts of the system for performing the position adjustment of the dispensing mechanism in the automatic analyzer according to the first embodiment of the present invention.

FIG. 5 is a flowchart illustrating the contents for performing the position adjustment of the dispensing mechanism in the automatic analyzer according to the first embodiment of the present invention.

FIG. 6 is a diagram illustrating a configuration of a system for performing position adjustment of a dispensing mechanism in an automatic analyzer according to a second embodiment of the present invention.

FIG. 7 is a diagram illustrating disposition of switches disposed on a housing of an analysis module AM according to the second embodiment of the present invention.

FIG. 8 is a flowchart illustrating the contents for performing the position adjustment of the dispensing mechanism in the automatic analyzer according to the second embodiment of the present invention.

DESCRIPTION OF EMBODIMENTS

Hereinafter, a configuration and an operation of an automatic analyzer according to an embodiment of the present invention will be described using the accompanying drawings.

EMBODIMENTS

First Embodiment

FIG. 1 is a diagram illustrating an overall configuration of an automatic analyzer to which the invention is applied. In FIG. 1, an analysis module AM includes a reaction disk 5 and two reagent disks 7A and 7B. The reagent disk 7A and the reagent disk 7B have the same configuration. The reagent disk 7B is disposed on an inner circumferential side of the reaction disk 5, and the reaction disk 7A is disposed at a position different from that of the reagent disk 7B.

In each of the reagent disks 7A and 7B, plural reagent containers 8 are disposed. Here, in each of the reagent disk 7A and the reagent disk 7B, the same reagent used for the same analytic items are provided. In the reagent disk 7A and the reagent disk 7B, different reagents may be provided. The reagent disks 7A and 7B are cooling boxes, and two opening portions 13 for dispensing the reagent are provided in each of the reagent disks 7A and 7B.

In the reaction disk 5, plural reaction containers 6 are provided. On an outer circumference of the reaction disk 5, two sample dispensing mechanisms 4A and 4B are disposed. Each of the sample dispensing mechanisms 4A and 4B is disposed in the vicinity of a sample transport unit 32 (in FIG. 1, the sample transport unit 32 in the vicinity of the sample dispensing mechanisms 4A and 4B is not shown for simplification), aspirates a predetermined amount of the sample from the sample container 2 that is held by a sample rack 3 transported by the sample transport unit 32, and dispenses (discharges) the aspirated sample into the reaction container 6 held in the reaction disk 5.

On an outer circumference of the reagent disk 7A, two reagent dispensing mechanisms 9A1 and 9A2 are disposed. On an outer circumference of the reagent disk 7B, two reagent dispensing mechanisms 9B1 and 9B2 are disposed. Each of the reagent dispensing mechanisms 9A1 and 9A2 aspirates a predetermined reagent from the reagent container 8 held in the reagent disk 7A, and dispenses (discharges) the aspirated reagent into the reaction container 6. Each of the reagent dispensing mechanisms 9B1 and 9B2 aspirates a predetermined reagent from the reagent container 8 held in the reagent disk 7B, and dispenses (discharges) the aspirated reagent into the reaction container 6.

On the outer circumference of the reaction disk 5, two stirring mechanisms 10A and 10B are disposed. Each of the stirring mechanisms 10A and 10B stirs the sample and the reagent in the reaction container 6.

The photometer 11 measures an absorbance of an analysis target component in the reaction container 6. After the end of the measurement of the sample using the photometer 11, the reaction container 6 is cleaned using a cleaning mechanism 12.

Next, an analysis method using an automatic analyzer according to a first embodiment of the invention will be described. The analysis of the sample is performed in the following procedure.

A predetermined amount of the sample is dispensed from the sample container 2 into the reaction container 6 by the sample dispensing mechanism 4A or the sample dispensing mechanism 4B. Next, a predetermined amount of the reagent is dispensed from the reagent container 8 of the reagent disk 7A into the reaction container 6 by either the reagent dispensing mechanism 9A1 or 9A2. Alternatively, a predetermined amount of the reagent is dispensed from the reagent container 8 of the reagent disk 7B into the reaction container 6 by either the reagent dispensing mechanism. 9B1 or 9B2. The sample and the reagent in the reaction container 6 are stirred by either the stirring mechanism 10A or 10B to prepare a reaction solution. The photometer 11 measures an absorbance of the reaction solution in the reaction container 6. An operation controller (hereinafter, referred to as "operation unit 1") calculates a measured value of the sample using the absorbance of the sample measured by the photometer 11 according to an analysis method preset per material to be tested.

In the first embodiment of the present invention, the plural reagent disks 7A and 7B, the plural sample dispensing mechanisms 4A and 4B, the plural reagent dispensing mechanisms 9A1, 9A2, 9B1, and 9B2, and the plural stirring mechanisms 10A and 10B are present in the single analysis module AM. The reason for this is that, by duplicating the respective mechanisms and operating the mechanisms on different phases, plural samples are analyzed at the same time, and the number of samples analyzed per time increase. The analysis module AM is not limited to a single-device operation, and plural analysis modules AM may be operated according to the user's desire.

Next, a configuration of a system for performing position adjustment of the dispensing mechanism in the automatic analyzer according to the first embodiment of the invention will be described using FIGS. 2 and 3.

FIG. 2 is a diagram illustrating the configuration of the system for performing the position adjustment of the dispensing mechanism in the automatic analyzer according to the first embodiment of the present invention. FIG. 3 is a diagram illustrating disposition of switches disposed on a housing 105 of the analysis module AM. In FIGS. 2 and 3, the same reference numerals as those of FIG. 1 represent the same components.

In FIGS. 2 and 3, position adjustment of a sample probe mechanism 4 and a reagent probe mechanism 9 is performed according to a position adjustment instruction that is given when probe position adjustment switches 101A, 101B, 111A, and 111B and probe operation switching switches 102 and 112 formed on the housing 105 of the analysis module AM are operated by an operator. In the example illustrated in FIG. 1, two sample probe mechanisms 4A and 4B are provided and have the same configuration. Thus, here, the sample probe mechanisms 4A and 4B will be considered as the sample probe mechanism 4. In addition, in the example illustrated in FIG. 1, four reagent probes 9A1, 9A2, 9B1, and 9B2 are provided and have the same configuration. Thus, in FIG. 2, the reagent probe mechanisms 9A1 and 9A2 are represented by 9A, and the reagent probe mechanisms 9B1 and 9B2 are represented by 9B.

Interlocking covers 103 and 113 that cover the analysis module AM are closed in a typical state. However, when the interlocking covers 103 and 113 are opened during analysis, the analysis module AM generates an interlocking alarm on a display unit included in the operation unit 1, and the sample probe mechanism 4 or the reagent probe mechanism 9 of the analysis module AM is in a stopped state. The interlocking covers 103 and 113 refer to covers that cover the analysis module in the automatic analyzer having an interlocking function. The interlocking function refers to a function of causing the dispensing mechanism to be in the stopped state when the cover is opened.

The front surface side (first) probe position adjustment switches 101A and 101B, the front surface side probe operation switching switch 102, and the front surface side (second) probe position adjustment switch 104 are disposed on a front surface side of the housing 105 of the analysis module AM. As illustrated in FIG. 3, the front surface side (second) probe position adjustment switch 104 is disposed at a distance of 100 cm or more from the front surface side (first) probe position adjustment switches 101A and 101B and the front surface side probe operation switching switch 102.

By continuously pressing the front surface side (second) probe position adjustment switch 104, even when the front surface side interlocking cover 103 is opened, various probe mechanisms of the analysis module AM are in an operable state without generating the interlocking alarm. Typically, by opening the interlocking cover 103, the sample probe mechanism 4 or the reagent probe mechanism 9 is in the stopped state, and thus the safety is secured. However, by performing the special operation of continuously pressing the (second) probe position adjustment switch 104, the sample probe mechanism 4 or the reagent probe mechanism 9 is in the operable state. Accordingly, the (second) probe position adjustment switch 104 can also be considered as an interlocking releasing switch for releasing the interlocking function to make the dispensing mechanism operable. However, by separately providing a mechanism that actually releases the interlocking function, the (second) probe position adjustment switch 104 may function as a switch for controlling the activation and inactivation of the (first) probe position adjustment switch 101A (101B) that inputs instructions for operating various probe mechanisms. For example, by continuously pressing the (second) probe position adjustment switch 104, the (first) probe position adjustment switch 101A (101B) may be activated to receive an input. In addition, in a case where the (second) probe position adjustment switch 104 is not pressed, the (first) probe position adjustment switch 101A (101B) may remain inactive not to receive an input without being activated even when being pressed.

By operating the front surface side (first) probe position adjustment switches 101A and 101B and the front surface side probe operation switching switch 102 while pressing the front surface side (second) probe position adjustment switch 104, the positions of the sample probe mechanism 4 and the reagent probe mechanisms 9A and 9B are adjusted. This way, when the operator typically the probe mechanism as the dispensing mechanism, it is necessary to operate the (first) probe position adjustment switch 101A (101B) and the (second) probe position adjustment switch 104 at the same time. As a result, the safety regarding the position adjustment of the dispensing mechanism is improved.

The back surface side (first) probe position adjustment switches 111A and 111B and the back surface side probe operation switching switch 112 are disposed on a back surface side of the housing 105 of the analysis module AM. In a state where the front surface side (second) probe position adjustment switch 104 is pressed, the back surface side (first) probe position adjustment switches 111A and 111B and the back surface side probe operation switching switch 112 are inoperable. That is, even in a case where the front surface side (second) probe position adjustment switch 104 is continuously pressed, the operation unit 1 does not follow instructions from the back surface side (first) position adjustment switches 111A and 111B and the operation switching switch 112 unless the back surface side (second) probe position adjustment switch 114 described below is continuously pressed.

As described above, as illustrated in FIG. 3, the back surface side (second) probe position adjustment switch 114 is disposed at a distance of 100 cm or more from the back surface side (first) probe position adjustment switches 111A and 111B or the back surface side probe operation switching switch 112. By continuously pressing the back surface side (second) probe position adjustment switch 114, even when the back surface side interlocking cover 113 is opened, the probe mechanisms of the analysis module AM are in an operable state without generating the interlocking alarm.

By operating the back surface side (first) probe position adjustment switches 111A and 111B and the back surface side probe operation switching switch 112 while pressing the back surface side (second) probe position adjustment switch 114, the positions of the sample probe mechanism 4 and the reagent probe mechanisms 9A and 9B are adjusted. In a state where the back surface side (second) probe position adjustment switch 114 is pressed, the front surface side probe position adjustment switches 101A and 101B and the front surface side probe operation switching switch 102 are inoperable. That is, even in a case where the back surface side (second) probe position adjustment switch 114 is continuously pressed, the operation unit 1 does not follow instructions from the front surface side (first) position adjustment switches 101A and 101B and the operation switching switch 102 unless the front surface side (second) probe position adjustment switch 104 is continuously pressed.

The (second) probe position adjustment switches 104 and 114 can be defined as switches for giving an instruction from the operator regarding whether or not to allow the dispensing mechanism of the analysis module AM to operate from the stopped state when the interlocking covers 103 and 113 are opened. As described above, the (second) probe position adjustment switch 104 (114) can also be considered as an interlocking releasing switch for releasing the interlocking function to make the dispensing mechanism operable. Hereinafter, in the first embodiment, a case where the (second) probe position adjustment switch 104 (114) is the interlocking releasing switch will be described as an example. Hereinafter, the embodiment will be described using the interlocking releasing switches 104 and 114.

Next, a configuration of main parts of the system for performing the position adjustment of the dispensing mechanism in the automatic analyzer according to the first embodiment of the invention will be described using FIG. 4. FIG.

4 is a diagram illustrating a configuration of main parts of the system for performing the position adjustment of the dispensing mechanism in the automatic analyzer according to the first embodiment of the present invention. In FIG. 4, the same reference numerals as those of FIGS. 1 and 2 represent the same components.

In FIG. 4, a microcomputer (position adjustment controller) 120 includes a determination unit 120A and a driving controller 120B. The microcomputer 120 is disposed in the analysis module AM and can also be disposed in the operation unit 1.

The determination unit 120A receives a signal from the operation unit 1 and input signals from the probe position adjustment switches 101 and 111, the probe operation switching switches 102 and 112, the interlocking releasing switches 104 and 114, and the interlocking covers 103 and 113, and switches a signal output to the driving controller 120B.

Based on the signal input from the determination unit 120A, the driving controller 120B outputs operation signals to the sample probe mechanism 4 and the reagent probe mechanisms 9A and 9B, and switches control contents of the sample probe mechanism 4 and the reagent probe mechanisms 9A and 9B.

The details of a method of performing the position adjustment of the dispensing mechanism in the determination unit 120A based on the driving controls of the respective units by the driving controller 120B will be described using FIG. 5.

Next, a control method for performing the position adjustment of the dispensing mechanism in the automatic analyzer according to the first embodiment of the invention will be described using FIG. 5. FIG. 5 is a flowchart illustrating the contents for performing the position adjustment of the dispensing mechanism in the automatic analyzer according to the first embodiment of the present invention. The position adjustment of the dispensing mechanism is a part of the maintenance work in a case where the device is in a standby state, and is mainly performed during device installation or during probe replacement. This position adjustment is a work of finely adjusting the position such that an access position of the probe such as the sample container, the reaction container, or the reagent container is at the center of an opening portion of each of the containers.

In FIG. 5, when the dispensing mechanism position adjustment starts, in Step S5, the operator determines which one of the sample probe mechanism 4 or the reagent probe mechanisms 9A and 9B is adjusted by the operation unit 1.

Next, in Step S10, the operator presses the probe operation switching switch 102 or 112 for a long time of 3 seconds. As a result, an LED disposed in the operation switching switch 102 or 112 is switched between turn-on and turn-off, and the contents of the adjustment of the sample probe mechanism 4 or the reagent probe mechanism 9 using the probe position adjustment switches 101A and 101B or 111A and 111B are changed. The change in the adjustment contents mainly refer to a change from a function of adjusting an operation position of the dispensing mechanism such as the sample probe mechanism 4 or the reagent probe mechanism 9 to a function selecting a position adjustment point or vice versa, and refers to a change in the function of the probe position adjustment switch. As described below, regarding the adjustment of the operation position, an adjustment direction of the operation position can be changed from a positive side to a negative side in a left, right, front, or rear direction in a horizontal plane by pressing the probe operation switching switch 102 or 112.

In Step S10, in a case where the LED of the probe operation switching switches 102 and 112 is turned off, the process proceeds to Step S100, an adjustment point (for example, an aspiration position, a discharge position, or a cleaning position) is selected in the probe position adjustment switches 101A, 101B, 111A, and 111B. At this time, the probe as an adjustment target that is selected along with the selection of the adjustment point actually horizontally moves to the adjustment point such as an aspiration position, a discharge position, or a cleaning position. Here, in a state where the interlocking cover is closed, the adjustment point can be selected. In a case where the interlocking cover is opened, the probe can be moved by operating the probe position adjustment switches 101 and 104 using both hands in order to prevent the probe position adjustment switches 101 and 104 from being operated by a single hand. For example, the probe can be moved by operating the probe position adjustment switches 101A, 101B, 111A, and 111B while continuously pressing the probe position adjustment switch 104 (or the interlocking releasing switch). In other words, in a case where the selection of the position adjustment point is performed in a state where the interlocking cover is opened, the microcomputer (position adjustment controller) 120 drives the dispensing mechanism toward the selected position adjustment point according to a selection instruction from the (first) position adjustment switch only in a state where the (second) position adjustment switch (interlocking releasing switch) is pressed.

In Step S100, the process returns to Step S10 after the end of the selection of the adjustment point. In Step S10, in a case where the LED of the front surface side probe operation switching switch 102 or 112 is turned on, the process proceeds to Step S15. By continuously pressing the front surface side interlocking releasing switch 104, the front surface side interlocking cover 103 can be opened without generating an alarm. Likewise, in a case where the LED of the back surface side operation switching switch 112 is turned on, the back surface side interlocking cover 113 can be opened without generating an alarm by continuously pressing the back surface side interlocking releasing switch 114. At this time, when the LED of the front surface side probe operation switching switch 102 is turned on, the LED of the back surface side operation switching switch 112 is not turned on even after pressing the back surface side operation switching switch 112 for a long time. Likewise, when the LED of the back surface side operation switching switch 112 is turned on, the LED of the front surface side probe operation switching switch 102 is not turned on even after pressing the front surface side probe operation switching switch 102 for a long time.

In Step S15, whether or not the interlocking releasing switch 104 or 114 is pressed is determined. In a case where it is determined that the interlocking releasing switch 104 or 114 is not pressed, the process proceeds to Step S105.

In Step S105, whether or not the interlocking cover 103 or 113 is opened is determined. In a case where the front surface side interlocking cover 103 is opened without pressing the front surface side interlocking releasing switch 104, the interlocking alarm is generated. Likewise, in a case where the back surface side interlocking cover 113 is opened without pressing the back surface side interlocking releasing switch 114, the interlocking alarm is generated.

Therefore, in Step S105, in a case where the interlocking covers 103 and 113 are not opened, the process returns to Step S15. In a case where the interlocking cover 103 or 113 is opened, the process proceeds to Step S110, and the interlocking alarm is output.

In Step S15, in a case where the interlocking releasing switch 104 or 114 is pressed, the process proceeds to Step S20.

In Step 20, whether or not the interlocking cover corresponding to the releasing switch is opened is determined. In a case where the back surface side interlocking cover 113 is opened in a state where the front surface side interlocking releasing switch 104 is continuously pressed, the front surface side interlocking releasing switch 104 and the back surface side interlocking cover 113 do not correspond to each other. Therefore, the process proceeds to Step S110, and the interlocking alarm is generated. Likewise, even in a case where the front surface side interlocking cover 103 is opened in a state where the back surface side interlocking releasing switch 114 is continuously pressed, the back surface side interlocking releasing switch 114 and the front surface side interlocking cover 103 do not correspond to each other. Therefore, the process proceeds to Step S110, and the interlocking alarm is generated.

In a case where the front surface side interlocking releasing switches 104 and 114 are pressed at the same time, the alarm is not generated. As a result, the probe position adjustment can be performed from the front surface side and the back surface side at the same time by two operators.

In Step S20, in a case where the interlocking cover corresponding to the releasing switch is opened, the process proceeds to Step S25.

In Step 25, whether or not the probe position is adjusted using the probe position adjustment switch corresponding to the releasing switch is determined.

While pressing the front surface side interlocking releasing switch 104 in a state where the front surface side interlocking cover 103 is opened, the probe position adjustment is performed using the front surface side probe position adjustment switch 101A or 101B and the front surface side probe operation switching switch 102. Likewise, while pressing the back surface side interlocking releasing switch 114 in a state where the back surface side interlocking cover 113 is opened, the probe position adjustment is performed using the back surface side probe position adjustment switch 111A or 111B and the back surface side operation switching switch 112. At this time, in a state where the front surface side interlocking releasing switch 104 is pressed, the back surface side probe position adjustment switches 111A and 111B and the back surface side operation switching switch 112 do not operate. Likewise, in a state where the back surface side interlocking releasing switch 114 is pressed, the front surface side probe position adjustment switches 101A and 101B and the front surface side probe operation switching switch 102 do not operate. The switch not operating represents that the device is inactivated and does not react when the switch is pressed.

Accordingly, in Step S25, in a case where the adjustment is not performed using the probe position adjustment switch corresponding to the releasing switch, the process does not proceed to the next step, and the determination of Step S25 is repeated.

In Step S25, in a case where the adjustment is performed using the probe position adjustment switch corresponding to the releasing switch, the process proceeds to the next step S30.

In a case where the adjustment is performed using the probe position adjustment switch corresponding to the releasing switch, the following operation is performed.

In the probe position adjustment, by pressing the front surface side probe position adjustment switch 101A, the selected probe mechanism horizontally operates by one pulse in the left direction. By pressing the front surface side probe position adjustment switch 101A while pressing the front surface side probe operation switching switch 102, the selected probe mechanism horizontally operates by one pulse in the right direction. As a result, for example, the probe is adjusted to be positioned at the center of the reaction container. Here, the probe mechanism is horizontally driven by a pulse motor. Therefore, the probe itself moves by a small distance due to the operation corresponding to one pulse.

Likewise, by pressing the front surface side probe position adjustment switch 101B, the selected probe mechanism horizontally operates by one pulse in the front direction. By pressing the front surface side probe position adjustment switch 101B while pressing the front surface side probe operation switching switch 102, the selected probe mechanism horizontally operates by one pulse in the rear direction. Likewise, by pressing the back surface side probe position adjustment switch 111A, the selected probe mechanism horizontally operates by one pulse in the left direction. By pressing the back surface side probe position adjustment switch 111A while pressing the back surface side probe operation switching switch 112, the selected probe mechanism horizontally operates by one pulse in the right direction. Likewise, by pressing the back surface side probe position adjustment switch 111B, the selected probe mechanism horizontally operates by one pulse in the front direction. By pressing the back surface side probe position adjustment switch 111B while pressing the back surface side probe operation switching switch 112, the selected probe mechanism horizontally operates by one pulse in the rear direction. With the above-described operation configuration, the fine adjustment of the operation position of the probe mechanism in the horizontal plane can be performed. The probe mechanism is drive in one of the left, right, front, and rear directions assuming that the interlocking releasing switch 104 is continuously pressed by the operator.

At this time, in a case where the probe operation switching switches 102 and 112 are pressed for a long time of 3 seconds while pressing the interlocking releasing switches 104 and 114, the switching of the LED between turn-on and turn-off is not performed. That is, the process does not proceed to the selection of the adjustment point in S100.

After the position adjustment of the probe mechanism ends in Step S30, the process proceeds to Step S35, the operator closes the interlocking covers 103 and 113, and the interlocking releasing switches 104 and 114 are released in Step S40.

Next, in Step S45, whether or not the adjustment of all the adjustment points (for example, the aspiration position, the discharge position, or the cleaning position) of the probe mechanism selected in Step S5 ends is determined. In a case where the adjustment of all the adjustment points does not end, the process returns to Step S10, the next adjustment point is selected, and the adjustment is performed such that the adjustment of all the adjustment points ends.

In a case where the adjustment of all the points ends in Step S45, the process proceeds to Step S50.

In Step S50, whether or not the adjustment of all the probe mechanisms of the analysis module AM ends is determined. In a case where the adjustment of all the probe mechanisms does not end, the process returns to Step S5, the next probe is selected, and the adjustment is performed such that the adjustment of all the probe mechanisms ends.

In Step S50, in a case where the adjustment of all the probe mechanisms of the analysis module ends, the process ends.

As described above, according to the first embodiment of the present invention, only the selection of the dispensing mechanism to be adjusted is performed in the operation unit 1, and the actual mechanism position adjustment can be performed at an installation position of the analysis module AM. Therefore, it is not necessary that, after giving a position adjustment instruction, the operator moves from the operation unit to the analysis module AM to check whether or not the dispensing mechanism is set at an intended position. In addition, two operators including an operator that performs an operation control and an operator that performs position adjustment are not necessary. Therefore, the complicatedness of the adjustment work is resolved. By providing a new selection mechanism to various switches, the selection of the dispensing mechanism may be performed at an installation position of the analysis module AM.

In addition, the interlocking releasing switches 104 and 114 are formed on the housing of the analysis module AM, and the interlocking alarm is generated unless the interlocking cover 103 or 113 is opened while pressing the interlocking releasing switches 104 and 114. Therefore, even in a case where the operator carelessly opens the interlocking cover 103 or 113, the operator can recognize that the interlocking cover is opened.

In addition, the distance between the interlocking releasing switches 104 and 114 and the probe position adjustment switches 101A, 101B, 111A, and 111B is 100 cm or more. Therefore, both hands of the operator are occupied during a work such as the position adjustment, and erroneous contact between the hands and the like and the probe mechanisms can be prevented. The microcomputer (position adjustment controller) 120 allows the adjustment of the operation position of the dispensing mechanism using the probe position adjustment switch only in a state where the interlocking releasing switch is pressed, and drives the dispensing mechanism according to the position adjustment instruction from the probe position adjustment switch.

In FIG. 3, the probe operation switching switches 102 and 112 are disposed in the vicinity of the probe position adjustment switches 101A, 101B, 111A, and 111B, but may be disposed in the vicinity of the interlocking releasing switches 104 and 114. That is, the probe operation switching switch is disposed in the vicinity of the probe position adjustment switch or the interlocking releasing switch and may be disposed in a range in which either the probe position adjustment switch or the interlocking releasing switch can be operated by a hand. Regarding the standard of the vicinity, it is preferable that the probe operation switching switch is disposed at a distance of less than 15 cm from either the probe position adjustment switch or the interlocking releasing switch. As described above, the probe operation switching switch switches between the function of allowing the first position adjustment switch to adjust the operation position of the dispensing mechanism and the position adjustment point. However, the probe operation switching switch is not limited to this configuration.

Further, in a case where the position adjustment of the dispensing mechanism is performed in a state where the interlocking cover 103 or 113 is opened, it is necessary that the operator operates the probe position adjustment switches 101A, 101B, 111A, and 111B and the probe operation switching switches 102 and 112 using a single hand while pressing the interlocking releasing switches 104 and 114 using another hand, and careless contact between the operator and the dispensing mechanism or the like during the operation can be prevented.

In the first embodiment, the distance between the interlocking releasing switches 104 and 114 and the probe position adjustment switches 101A, 101B, 111A, and 111B is 100 cm or more. In a case where the distance is 30 cm or more, it is difficult to perform the operation with a single hand, and both hands are occupied. As a result, erroneous contact between the hands and the like and the probe mechanisms can be prevented. As described above, the microcomputer (position adjustment controller) 120 drives the dispensing mechanism only in a case where the interlocking releasing switch is pressed.

Accordingly, the distance between the interlocking releasing switches 104 and 114 and the probe position adjustment switches 101A, 101B, 111A, and 111B is 30 cm or more, which is less than the width of the analysis module AM. The distance is preferably 30 cm or more in the horizontal direction. That is, the probe position adjustment switches 101A, 101B, 111A, and 111B and the interlocking releasing switches 104 and 114 may be disposed to be separated by a distance at which the switches cannot be operated by a single hand of the operator at the same time. For example, the probe position adjustment switch and the interlocking releasing switch may be disposed on an upper surface of the housing, the probe position adjustment switch may be disposed on one end side of the upper surface of the housing, and the interlocking releasing switch may be disposed on another end side of the housing. In the example of FIG. 2, the width of the automatic analyzer is 30 cm or more. With this configuration, the switches cannot be operated at the same time by a single hand.

In addition, in the example illustrated in the drawing, the interlocking releasing switch 104 and the probe position adjustment switches 101A and 101B are disposed on a side surface side of the interlocking cover 103 with the interlocking cover 103 interposed therebetween. As a result, erroneous contact with the probe mechanism during the probe position adjustment can be prevented without any particular limitation on the distance. In other words, by disposing the interlocking releasing switch 104 and the probe position adjustment switch to be separated from each other with the interlocking cover interposed therebetween, the same preventing effect can be imparted to the device without any particular limitation on the distance.

In the first embodiment, the function of adjusting the operation position of the dispensing mechanism and the function of selecting a position adjustment point of the dispensing mechanism are imparted to the probe position adjustment switch. However, it is not necessary to impart the two functions to one switch. For example, by increasing the number of switches, a switch for adjusting the operation position and a switch for selecting the position adjustment point may be separately provided. In this case, the operation switching switch can also be made unnecessary. By imparting plural functions to one switch using the operation switching switch, the number of switches can be reduced.

In addition, in the first embodiment, the dispensing mechanism position adjustment time can be reduced.

In addition, in the example illustrated in the drawing, the interlocking releasing switches 104 and 114, the probe position adjustment switches 101A, 101B, 111A, and 111B, and the probe operation switching switches 102 and 112 are formed on the upper surface of the housing 105 of the analysis module AM. On the side surface of the housing 105 of the analysis module AM, the interlocking releasing switches 104 and 114 and another position adjustment switch can also be disposed to be separated from each other by a distance at which the switches cannot be operated by a single hand of the operator at the same time.

In addition, in the first embodiment, the example of the interlocking releasing switch has been described. However, as described above, the interlocking releasing switch may function as a switch for controlling the activation and inactivation of the probe position adjustment switch 101A (101B) without imparting the function of releasing the interlocking to the interlocking releasing switch. In this case, the interlocking releasing switch described above can be considered as simply the (second) probe position adjustment switch.

Second Embodiment

Next, a configuration of a system for performing position adjustment of a dispensing mechanism in an automatic analyzer according to a second embodiment of the invention will be described using FIGS. 6 and 7.

FIG. 6 is a diagram illustrating the configuration of the system for performing the position adjustment of the dispensing mechanism in the automatic analyzer according to the second embodiment of the present invention. FIG. 7 is a diagram illustrating disposition of switches disposed on a housing 105 of the analysis module AM. The overall configuration of the automatic analyzer is the same as the example illustrated in FIG. 1, and thus the drawing and the detailed description will be omitted. In addition, in FIGS. 6 and 7, the same reference numerals as those of FIGS. 1, 2, and 3 do not represent the same components.

In FIGS. 6 and 7, as in FIGS. 2 and 3, the two sample probe mechanisms 4A and 4B will be considered as the sample probe mechanism 4. In addition, the reagent probe mechanisms 9A1 and 9A2 are represented by 9A, and the reagent probe mechanisms 9B1 and 9B2 are represented by 9B.

In FIGS. 6 and 7, the position adjustment of the sample probe mechanism 4 and the reagent probe mechanisms 9A and 9B is performed by the probe position adjustment switches 101A, 101B, 101C, 101D, 111A, 111B, 111C, and 111D and the probe operation switching switches 102 and 112 that are formed on the housing 105 of the analysis module AM.

The interlocking covers 103 and 113 are closed in a typical state. However, when the interlocking covers 103 and 113 are opened during analysis, the analysis module AM generates an interlocking alarm on a display unit included in the operation unit 1, and the sample probe mechanism 4 or the reagent probe mechanism 9 of the analysis module AM is in a stopped state.

The front surface side probe position adjustment switches 101A, 101B, 101C, and 101D and the front surface side probe operation switching switch 102 are disposed on the front surface side of the housing 105 of the analysis module AM. As illustrated in FIG. 7, the front surface side probe operation switching switch 102 is disposed at a distance of 100 cm or more from the front surface side probe position adjustment switches 101A to 101D. By continuously pressing the front surface side probe operation switching switch 102, even when the front surface side interlocking cover 103 is opened, various probe mechanisms of the analysis module AM are in an operable state without generating the interlocking alarm.

By operating the front surface side probe position adjustment switches 101A to 101D while pressing the front surface side probe operation switching switch 102, the positions of the sample probe mechanism 4 and the reagent probe mechanisms 9A and 9B are adjusted. The back surface side probe position adjustment switches 111A, 111B, 111C, and 111D and the back surface side probe operation switching switch 112 are disposed on a back surface side of the housing 105 of the analysis module AM. In a state where the front surface side probe operation switching switch 102 is pressed, the back surface side probe position adjustment switches 111A, 111B, 111C, and 111D and the back surface side probe operation switching switch 112 are inoperable. That is, the operation unit 1 does not follow instructions from the position adjustment switches 111A, 111B, 111C, and 111D and the operation switching switch 112.

As illustrated in FIG. 7, as in the example of FIG. 2, the back surface side probe operation switching switch 112 is disposed at a distance of 100 cm or more from the back surface side probe position adjustment switches 111A, 111B, 111C, and 111D. By continuously pressing the back surface side probe operation switching switch 112, even when the back surface side interlocking cover 113 is opened, various probe mechanisms of the analysis module AM are in an operable state without generating the interlocking alarm.

By operating the back surface side probe position adjustment switches 111A to 111D while pressing the back surface side probe operation switching switch 112, the positions of the probe mechanisms 4, 9A, and 9B are adjusted. In a state where the back surface side probe operation switching switch 112 is pressed, the front surface side probe position adjustment switches 101A to 101D and the front surface side probe operation switching switch 102 are inoperable. That is, the operation unit 1 does not follow instructions from the position adjustment switches 101A to 101D and the operation switching switch 102.

A configuration of main parts of the system for performing the position adjustment of the dispensing mechanism in the automatic analyzer according to the second embodiment of the invention is the same as that of the system illustrated in FIG. 4. However, the interlocking releasing switches 104 and 114 illustrated in FIG. 4 is not necessary in the second embodiment, and the probe operation switching switches 102 and 112 also function as the interlocking releasing switch as described below. That is, the probe operation switching switches 102 and 112 correspond to the (second) probe position adjustment switch, and it can be said that the (second) probe position adjustment switch also functions as the probe operation switching switch. Hereinafter, in the second embodiment, a case where the (second) probe position adjustment switch is the probe operation switching switch will be described as an example. Hereinafter, the embodiment will be described using the probe operation switching switch.

Next, a control method for performing the position adjustment of the dispensing mechanism in the automatic analyzer according to the second embodiment of the invention will be described using FIG. 8. FIG. 8 is a flowchart illustrating the contents for performing the position adjustment of the dispensing mechanism in the automatic analyzer according to the second embodiment of the present invention.

In FIG. 8, when the dispensing mechanism position adjustment starts, in Step S205, the operator determines which one of the sample probe mechanism 4 or the reagent probe mechanisms 9A and 9B is adjusted by the operation unit 1.

Next, in Step S210, the operator presses the probe operation switching switch 102 or 112. As a result, an LED of the operation switching switches 102 and 112 is switched between turn-on and turn-off, and the contents of the adjustment of the sample probe mechanism 4 or the reagent probe mechanisms 9A and 9B using the probe position adjustment switches 101A to 101D and 111A to 111D are changed.

In Step S210, in a case where the LED of the probe operation switching switches 102 and 112 is turned off, the process proceeds to Step S300, an adjustment point (for example, an aspiration position, a discharge position, or a cleaning position) is selected in the probe position adjustment switches 101A to 101D and 111A to 111D. At this time, the probe as an adjustment target that is selected along with the selection of the adjustment point actually horizontally moves to the adjustment point such as an aspiration position, a discharge position, or a cleaning position. Here, in a state where the interlocking cover is closed, the adjustment point can be selected. In a case where the interlocking cover is opened, the probe can be moved by operating the probe position adjustment switches 101 and 102 using both hands in order to prevent the probe position adjustment switches 101 and 102 from being operated by a single hand. For example, the probe can be moved by operating the probe position adjustment switches 101A to 101D and 111A to 111D while continuously pressing the probe position adjustment switch 102 (or the probe operation switching switch). In other words, in a case where the selection of the position adjustment point is performed in a state where the interlocking cover is opened, the microcomputer (position adjustment controller) 120 drives the dispensing mechanism toward the selected position adjustment point according to a selection instruction from the (first) position adjustment switch only in a state where the (second) position adjustment switch (probe operation switching switch) is pressed.

In Step S300, the process returns to Step S210 after the end of the selection of the adjustment point. In Step S210, in a case where the LED of the front surface side probe operation switching switches 102 and 112 is turned on, the process proceeds to Step S215. In Step S215, whether or not the probe operation switching switch 102 or 112 is continuously pressed is determined. In a case where the probe operation switching switch 102 or 112 is not continuously pressed, Step S215 is repeated.

In Step S215, in a case where the front surface side operation switching switch 102 of which the LED is turned on is continuously pressed, the process proceeds to Step S220, and whether or not the adjustment is performed using the probe position adjustment switches 101A to 101D and 111A to 111D corresponding to the operation switching switch 102 or 112 is determined. In a case where the adjustment is not performed using the probe position adjustment switches 101A to 101D and 111A to 111D corresponding to the probe operation switching switch 102 or 112, Step S220 is repeated.

In Step S220, whether or not the interlocking cover 103 or 113 corresponding to the probe operation switching switch 102 or 112 is opened is determined. In a case where the back surface side interlocking cover 113 is opened in a state where the front surface side probe operation switching switch 102 is continuously pressed, the front surface side probe operation switching switch 102 and the back surface side interlocking cover 113 do not correspond to each other. Therefore, the process proceeds to Step S310, and the interlocking alarm is generated. Likewise, even in a case where the front surface side interlocking cover 103 is opened in a state where the back surface side probe operation switching switch 112 is continuously pressed, the back surface side probe operation switching switch 112 and the front surface side interlocking cover 103 do not correspond to each other. Therefore, the process proceeds to Step S310, and the interlocking alarm is generated.

In Step S220, in a case where the interlocking cover corresponding to the operation switching switch is opened, the process proceeds to Step S225.

In Step S225, in a case where the adjustment is performed using the probe position adjustment switches 101A to 101D and 111A to 111D corresponding to the probe operation switching switch 102 or 112, the process proceeds to Step S230.

The determination of Steps S220 and S225 will be described in more detail. In a state where the probe operation switching switch 102 of which the LED is turned on is continuously pressed by the operator, the operator opens the front surface side interlocking cover 103 and the front surface side probe position adjustment switches 101A to 101D are operated such that whether or not the adjustment of the probe mechanism 4 or 9A and 9B is performed is adjusted.

Likewise, in a state where the back surface side probe operation switching switch 112 of which the LED is turned on is continuously pressed by the operator, the operator opens the back surface side interlocking cover 113 and the back surface side probe position adjustment switches 111A to 111D are operated such that whether or not the adjustment of the probe mechanism 4 or 9A and 9B is performed is adjusted. At this time, in a state where the operator continuously presses the front surface side probe operation switching switch 102, the back surface side probe position adjustment switches 111A to 111D and the back surface side probe operation switching switch 112 are controlled to be inoperable. Likewise, in a state where the operator continuously presses the back surface side probe operation switching switch 112, the front surface side probe position adjustment switches 101A to 101D and the front surface side probe operation switching switch 102 are controlled to be inoperable.

The determination of Steps S220 and S310 will be described in more detail. In a case where the back surface side interlocking cover 113 is opened during the probe position adjustment in the front surface side probe position adjustment switch 101 in a state where the front surface side probe operation switching switch 102 of which the LED is turned on is continuously pressed by the operator, the front surface side probe operation switching switch 102 and the back surface side interlocking cover 113 do not correspond to each other. Therefore, the interlocking alarm is generated.

Likewise, in a case where the front surface side interlocking cover 103 is opened during the probe position adjustment in the back surface side probe position adjustment switch 111 in a state where the back surface side probe operation switching switch 112 of which the LED is turned on is continuously pressed by the operator, the back surface side probe operation switching switch 112 and the front surface side interlocking cover 103 do not correspond to each other. Therefore, the interlocking alarm is generated.

In a case where the front surface side probe operation switching switch 102 and the back surface side probe operation switching switch 112 are pressed at the same time, the alarm is not generated. As a result, the probe position adjustment can be performed from the front surface side and the back surface side by two operators at the same time.

Regarding the determination in Step 225, the adjustment is performed in a state where the interlocking cover 103 or 113 is opened. Therefore, the operation of this case will be described. That is, in a state where the front surface side probe operation switching switch 102 of which the LED is turned on is continuously pressed by the operator, the position adjustment of the probe mechanisms 4, 9A, and 9B is performed by the front surface side probe position adjustment switches 101A to 101D.

Likewise, in a state where the back surface side probe operation switching switch 112 of which the LED is turned on is continuously pressed by the operator, the position adjustment of the probe mechanisms 4, 9A, and 9B is performed by the back surface side probe position adjustment switch 111. At this time, in a state where the front surface side probe operation switching switch 102 of which the LED is turned on is pressed by the operator, the back surface side probe position adjustment switch 111 and the back surface side probe operation switching switch 112 do not operate. Likewise, in a state where the back surface side probe operation switching switch 112 of which the LED is turned on is pressed by the operator, the front surface side probe position adjustment switch 101 and the front surface side probe operation switching switch 102 are controlled not to operate. The switch not operating represents that the device is inactivated and does not react when the switch is pressed.

The probe position adjustment will be described.

By the operator pressing the front surface side probe position adjustment switch 101A, the probe mechanism 4, 9A, or 9B horizontally operates by one pulse in the left direction. By the operator pressing the front surface side probe position adjustment switch 101B, the probe mechanism 4, 9A, or 9B horizontally operates by one pulse in the right direction. By the operator pressing the front surface side probe position adjustment switch 101C, the probe mechanism 4, 9A, or 9B horizontally operates by one pulse in the rear direction. By the operator pressing the front surface side probe position adjustment switch 101D, the probe mechanism 4, 9A, or 9B horizontally operates by one pulse in the front direction. Likewise, by the operator pressing the back surface side probe position adjustment switch 111A, the probe mechanism 4, 9A, or 9B horizontally operates by one pulse in the left direction. By the operator pressing the rear surface side probe position adjustment switch 111B, the probe mechanism 4, 9A, or 9B horizontally operates by one pulse in the right direction. By the operator pressing the rear surface side probe position adjustment switch 111C, the probe mechanism 4, 9A, or 9B horizontally operates by one pulse in the rear direction. By the operator pressing the back surface side probe position adjustment switch 111D, the probe mechanism 4, 9A, or 9B horizontally operates by one pulse in the front direction.

After the position adjustment of the probe mechanism 4, 9A, or 9B ends in Step S230, the process proceeds to Step S235, the operator closes the interlocking covers 103 and 113. In addition, the process proceeds to Step S240, and the operator releases the probe operation switching switches 102 and 112.

Next, in Step S245, whether or not the adjustment of all the adjustment points (for example, the aspiration position, the discharge position, or the cleaning position) of the probe mechanism selected in Step S205 ends is determined. In a case where the adjustment of all the adjustment points does not end, the process returns to Step S210, the next adjustment point is selected, and the adjustment is performed such that the adjustment of all the adjustment points ends.

In a case where the adjustment of all the adjustment points ends in Step S245, the process proceeds to Step S250.

In Step S250, whether or not the adjustment of all the probe mechanisms ends is determined. In a case where the adjustment of all the probe mechanisms does not end, the process proceeds to Step S205, the next dispensing mechanism is selected, and the adjustment is performed such that the adjustment of all the dispensing mechanisms ends.

In Step S250, in a case where the adjustment of all the dispensing mechanisms ends, the process ends.

As described above, according to the second embodiment of the present invention, as in the first embodiment, only the selection of the mechanism to be adjusted is performed in the operation unit 1, and the actual mechanism position adjustment can be performed at an installation position of the analysis module AM. Therefore, it is not necessary that, after giving a position adjustment instruction, the operator moves from the operation unit to the analysis module AM to check whether or not the dispensing mechanism is set at an intended position. In addition, two operators including an operator that performs an operation control and an operator that performs position adjustment are not necessary. Therefore, the complicatedness of the adjustment work is resolved. By providing a new selection mechanism to various switches, the selection of the dispensing mechanism may be performed at an installation position of the analysis module AM.

In addition, the probe operation switching switches 102 and 112 that also function as the interlocking releasing switch are formed on the housing 105 of the analysis module AM, and the interlocking alarm is generated unless the interlocking cover 103 or 113 is opened while pressing the probe operation switching switches 102 and 112 as the interlocking releasing switch. Therefore, even in a case where the operator carelessly opens the interlocking cover 103 or 113, the operator can recognize that the interlocking cover is opened.

Further, as in the first embodiment, the distance between the probe operation switching switches 102 and 112 as the interlocking releasing switch and the probe position adjustment switches 101A to 101D and 111A to 111D is 100 cm or more. Therefore, both hands of the operator are occupied during a work such as the position adjustment, and erroneous contact between the hands and the like and the probe mechanisms can be prevented.

The distance between the probe operation switching switches 102 and 112 as the interlocking releasing switch and the probe position adjustment switches 101A to 101D and 111A to 111D is 100 cm or more. In a case where the distance is 30 cm or more, it is difficult to perform the operation with a single hand, and both hands are occupied. As a result, erroneous contact between the hands and the like and the probe mechanisms can be prevented.

Accordingly, the distance between the probe operation switching switches 102 and 112 as the interlocking releasing switch and the probe position adjustment switches 101A to 101D and 111A to 111D is 30 cm or more, which is less than the width of the analysis module AM. The distance is preferably 30 cm or more in the horizontal direction. That is, the probe position adjustment switches 101A to 101D and 111A to 111D and the probe operation switching switches 102 and 112 as the interlocking releasing switch may be disposed to be separated by a distance at which the switches cannot be operated by a single hand of the operator at the same time.

In addition, in the example illustrated in the drawing, the probe operation switching switches 102 and 112 as the interlocking releasing switch and the probe position adjustment switches 101A to 101D and 111A to 111D are disposed to be separated from each other on aside surface side of the interlocking covers 103 and 113 with the interlocking covers 103 and 113 interposed therebetween. As a result, erroneous contact with the probe mechanism during the probe position adjustment can be prevented without any particular limitation on the distance.

In the second embodiment, the function of adjusting the operation position of the dispensing mechanism and the function of selecting a position adjustment point of the dispensing mechanism are imparted to the probe position adjustment switch. However, it is not necessary to impart the two functions to one switch. For example, by increasing the number of switches, a switch for adjusting the operation position and a switch for selecting the position adjustment point may be separately provided.

In addition, in a case where the position adjustment of the probe mechanism is performed in a state where the interlocking cover 103 or 113 is opened, it is necessary that the operator operates the probe position adjustment switches 101A to 101D and 111A to 111D using a single hand while pressing the probe operation switching switches 102 and 112 as the interlocking releasing switch using another hand, and careless contact between the operator and the probe mechanism or the like during the operation can be prevented.

In addition, in the example illustrated in the drawing, the probe operation switching switches 102 and 112 as the interlocking releasing switch and the probe position adjustment switches 101A to 101D and 111A to 111D are formed on the upper surface of the housing 105 of the analysis module AM. On the side surface of the housing 105 of the analysis module AM, the probe operation switching switches 102 and 112 as the interlocking releasing switch, another position adjustment switch, and the operation switching switch can also be disposed to be separated from each other by a distance at which the switches cannot be operated by a single hand of the operator at the same time.

In addition, in the second embodiment, the probe operation switching switches 102 and 112 also function as the interlocking releasing switch and the operation switching switch. Therefore, by providing a room in the disposition region of the probe position adjustment switches, respective switches for moving the probe mechanism in the left, right, front, and rear directions can be provided, and the operability can be improved.

In addition, in the second embodiment, the dispensing mechanism position adjustment time can also be reduced.

In the example illustrated in the diagram, among the probe position adjustment switches 101A to 101D and 111A to 111D, the adjustment switches 101A and 111A for the left direction are disposed on the left side, the adjustment switches 101B and 111B for the right direction are disposed on the right side, the adjustment switches 101C and 111C for the rear direction are disposed on the upper side, and the adjustment switches 101D and 111D for the front direction are disposed on the lower side. Therefore, the operability by the operator can be improved.

The probe position adjustment switches 101A to 101D and 111A to 111D are not limited to the disposition illustrated in the drawing and, for example, may be aligned on a horizontal line or a vertical line.

In addition, in the present invention, the position adjustment switches 101A to 101D and 111A to 111D and the probe operation switching switches 102 and 112 may be disposed on the upper surface of the housing 105, the position adjustment switches 101A to 101D and 111A to 111D may be disposed on one end side of the housing AM, and the probe operation switching switches 102 and 112 may be disposed on another end side of the upper surface of the housing.

In addition, in the second embodiment, the example in which the probe operation switching switch also functions as the interlocking releasing switch has been described. However, as in the first embodiment, the probe operation switching switch may function as a switch for controlling the activation and inactivation of the probe position adjustment switch without imparting the function of releasing the interlocking to the probe operation switching switch. In this case, the probe operation switching switch described above can be considered as simply the (second) probe position adjustment switch.

REFERENCE SIGNS LIST

1: operation unit
2: sample container
3: sample rack
4A, 4B: sample dispensing mechanism
5: reaction disk
6: reaction container
7A, 7B: reagent disk
8: reagent container
9A1, 9A2, 9B1, 9B2: reagent dispensing mechanism
10A, 10B: stirring mechanism
11: photometer
12: cleaning mechanism
13: cover opening portion
32: sample transport unit
101A, 101B, 101C, 101D: front surface side probe position adjustment switch
102: front surface side probe operation switching switch
103: front surface side interlocking cover
104: front surface side interlock releasing switch (or (second) probe position adjustment switch)
105: housing
111: back surface side probe position adjustment switch
112: back surface side probe operation switching switch
113: back surface side interlocking cover
114: back surface side interlock releasing switch (or (second) probe position adjustment switch) 120: microcomputer (position adjustment controller)
120A: determination unit
120B: driving controller
AM: analysis module

The invention claimed is:

1. An automatic analyzer comprising:
an analysis module including a sample dispensing mechanism that aspirates a sample from a sample container and discharges the aspirated sample into a reaction container, a reagent dispensing mechanism that aspirates a reagent from a reagent container and discharges the aspirated reagent into the reaction container, and a photometer that measures the sample in the reaction container;
first and second physical position adjustment switches and a physical operation switching switch that are disposed on a housing of the analysis module and are operated by an operator to adjust an operation position of either the sample dispensing mechanism or the reagent dispensing mechanism; and
a controller configured to:
drive the sample dispensing mechanism or the reagent dispensing mechanism according to a first position adjustment instruction from the first position adjustment switch and a second position adjustment instruction from the second position adjustment switch, and receive a selection of selecting either the sample dispensing mechanism or the reagent dispensing mechanism to be adjusted by the first position adjustment switch, wherein the first position adjustment switch and the second position adjustment switch are disposed to be separated from each other by a distance at which the first position adjustment switch and the second position adjustment switch are not operable by a single hand of the operator at the same time, wherein the first position adjustment switch is disposed on one end side of an upper surface of the housing, wherein the second position adjustment switch is disposed on the other end side of the upper surface of the housing, and wherein the controller is further configured to:

determine whether the first position adjustment switch is pressed based on the first position adjustment instruction signal input from the first position adjustment switch, determine whether the second position adjustment switch is pressed based on the second position adjustment instruction signal input from the second position adjustment switch, and determine whether the first position adjustment switch adjusts the operation position of the sample dispensing mechanism or the reagent dispensing mechanism or the first position adjustment switch selects a position adjustment point based on an input signal from the operation switching switch, upon determining the first position adjustment switch adjusts the operation position of the sample dispensing mechanism or the reagent dispensing mechanism, as selected, adjust an operation position of either the sample dispensing mechanism or the reagent dispensing mechanism, as selected, according to the input first position adjustment instruction from the first position adjustment switch only upon determining the second position adjustment switch is simultaneously pressed based on the input second position adjustment instruction, and upon determining the first position adjustment switch selects a position adjustment point based on an input signal from the operation switching switch, drive the sample dispensing mechanism or the reagent dispensing mechanism toward a selected position adjustment point based on the input first position adjustment instruction switch only upon determining the second position adjustment switch is simultaneously pressed based on the input second position adjustment instruction, wherein the position adjustment point indicates a position of one of an aspiration position, a discharge position, and a cleaning position of the sample dispensing mechanism or the reagent dispensing mechanism, as selected.

2. The automatic analyzer according to claim 1, wherein the first position adjustment switch and the second position adjustment switch are disposed separated from each other by 30 cm or more.

3. The automatic analyzer according to claim 2, further comprising:

an interlocking cover that covers the analysis module, wherein the controller is configured to:

stop the sample dispensing mechanism and the reagent dispensing mechanism upon determining the interlocking cover is open, and upon determining the interlocking cover is open while the second position adjustment switch is simultaneously pressed, operate the sample dispensing mechanism and the reagent dispensing mechanism from the stopped state.

4. The automatic analyzer according to claim 1, further comprising:

an interlocking cover that covers the analysis module, wherein the controller is configured to:

stop the sample dispensing mechanism and the reagent dispensing mechanism upon determining the interlocking cover is open, and upon determining the interlocking cover is open while the second position adjustment switch is simultaneously pressed, operate the sample dispensing mechanism and the reagent dispensing mechanism from the stopped state.

5. The automatic analyzer according to claim 4, further comprising:

an operation switching switch, wherein the controller is configured to:

upon determining the interlocking cover is open and the first position adjustment switch selects a position adjustment point based on an input signal from the operation switching switch, drive the sample dispensing mechanism or the reagent dispensing mechanism toward a selected position adjustment point based on the input first position adjustment instruction switch only upon determining the second position adjustment switch is simultaneously pressed based on the input second position adjustment instruction.

6. The automatic analyzer according to claim 5, further comprising:

wherein the operation switching switch is disposed at a distance of less than 15 cm from the first position adjustment switch or the second position adjustment switch.

7. The automatic analyzer according to claim 6, further comprising: third and fourth position adjustment switches, a second operation switching switch, and a second interlocking cover are disposed on a back surface of the housing, and wherein the first and second position adjustment switches, the operation switching switch as a first operation switch, and the interlocking cover as a first interlocking cover are disposed on a front surface of the housing, and wherein the controller is configured to:

upon determining the second position adjustment switch disposed on the front surface of the housing is pressed ignore instructions based on input signals from the third position adjustment switch and the second operation switching switch, and upon determining the fourth position adjustment switch is pressed ignore instructions based on input signals from the first position adjustment switch and the first operation switching switch.

8. The automatic analyzer according to claim 4, wherein the first position adjustment switch and the second position adjustment switch are disposed with the interlocking cover interposed therebetween.

9. The automatic analyzer according to claim 1, further comprising: third and fourth position adjustment switches, and a second interlocking cover are disposed on a back surface of the housing, and wherein the first and second position adjustment switches and the interlocking cover, as a first interlocking cover, are disposed on a front surface of the housing, and wherein the controller is configured to:

upon determining the second position adjustment switch is pressed ignore instructions based on input signals from the third position adjustment switch, and upon determining the fourth position adjustment switch is pressed ignore instructions based on input signals from the first position adjustment switch.

10. The automatic analyzer according to claim 1, wherein the controller is configured to generate an alarm upon determining an interlocking cover is open, and upon determining the interlocking cover is open and upon determining the second position adjustment switch is simultaneously pressed based on the input second position adjustment instruction, do not generate the alarm.

11. The automatic analyzer according to claim 1, wherein the automatic analyzer comprises a plurality of the analysis modules.

* * * * *